United States Patent [19]

Paitula et al.

[11] 4,167,254
[45] Sep. 11, 1979

[54] LOCKING DEVICE FOR VEHICLE SAFETY SEAT BELTS

[75] Inventors: Hannu O. Paitula, Järna; Roland A. Larsson, Södertälje, both of Sweden

[73] Assignee: Gränges Essem Aktiebolag, Västerås, Sweden

[21] Appl. No.: 813,693

[22] Filed: Jul. 7, 1977

[30] Foreign Application Priority Data

Jul. 12, 1976 [SE] Sweden .............................. 7607925

[51] Int. Cl.² ...................... A62B 35/02; B65H 75/48
[52] U.S. Cl. ...................... 242/107.4 A; 242/107.4 B
[58] Field of Search ................. 242/107.4 R–107.4 E; 280/744–747; 297/388

[56] References Cited

U.S. PATENT DOCUMENTS

| | | | |
|---|---|---|---|
| 3,770,225 | 11/1973 | Boblitz | 242/107.4 R |
| 3,797,603 | 3/1974 | Loomba | 242/107.4 A X |
| 3,819,126 | 6/1974 | Stoffel | 242/107.4 A |
| 3,937,416 | 2/1976 | Henderson | 242/107.4 B X |
| 3,991,953 | 11/1976 | Takada | 242/107.4 A |
| 4,059,242 | 11/1977 | Tanaka | 242/107.4 A |

Primary Examiner—Harvey C. Hornsby
Assistant Examiner—John M. Jillions
Attorney, Agent, or Firm—Browdy and Neimark

[57] ABSTRACT

A locking device for seat belts intended for vehicles of the type in which a strap being a part of the seat belt is automatically drawn into and wound up on a rotatable coiling shaft when the seat belt is not used, to temporarily lock the shaft. The device comprises a ratchet means non-rotatably arranged on the shaft; a locking means fixedly mounted in relation to the shaft; at least one locking body accommodated in the locking means and arranged for displacement from a neutral position to a locking position in which the locking body engages with the ratchet means for preventing rotation of the shaft; and a rotatably mounted guiding means. The guiding means is provided with a guiding surface for the locking body and is coupled to the shaft at the beginning of the locking operation to be turned by the shaft on its rotation due to withdrawal of strap from a normal position to a locking position and thereby to move the locking body to the locking position.

9 Claims, 4 Drawing Figures

LOCKING DEVICE FOR VEHICLE SAFETY SEAT BELTS

BACKGROUND OF THE INVENTION

The present invention relates to a locking device for seat belts intended for vehicles, of the type in which a strap forming a part of the seat belt is automatically drawn into a casing and wound up on a rotatable coiling shaft when the belt is not used, to temporarily lock the shaft.

Is is previously known to arrange locking of the shaft in a coiling device by providing the shaft with a body rotating with the shaft, in said body there being arranged a number of displaceable locking bodies arranged to be moved to a locking position in which they engage with a fixed toothed ring outside the rotational path of the rotating body, so that the shaft is prevented from rotating and withdrawal of the strap of the seat belt cannot take place, whereby the person wearing the seat belt is safely kept in place. Displacement of the locking bodies to the locking position can thereby take place either in response to a rapid withdrawal of strap, the locking device thus being responsive to strap movement, or in response to an acceleration or retardation of the vehicle, the locking device thus being responsive to vehicle movement. The locking device can also be made so that it is responsive to both strap and vehicle movement.

By having the locking bodies in the known locking catch devices arranged in a body rotating with the shaft, the locking bodies will be brought into contact with the fixed toothed ring at a large velocity relative to it, which can result in bouncing and unreliable locking function. By reason of the displaceability of the locking bodies in the body rotating with the shaft, there also easily arises a rattling sound in the locking catch device caused by movements or vibrations of the locking bodies even for slow withdrawal of strap from the coiling device.

SUMMARY OF THE INVENTION

The main object of the invention is to provide a coiling device of the type set forth in the introduction, which gives a quick and reliable locking function and in which the above mentioned drawbacks have been removed.

Since the locking bodies according to the invention are placed in a locking means which is stationary in relation to the rotational movement of the shaft, and engage with a ratchet on the shaft, there is no rattle from the locking bodies when the strap is withdrawn, since the locking bodies do not accompany the shaft in its rotation. Furthermore, since the locking bodies are displaced from a neutral position to a locking position in a path running in a direction such that the locking bodies move with the periphery of the ratchet when withdrawing the strap belt, the speed of the locking bodies relative to the ratchet can be substantially reduced in relation to what has been possible previously, whereby a more distinct and reliable locking function is obtained, as well as less wear. There is indeed a larger relative movement between the locking bodies and the locking means in which they are accomodated, but this relative movement can easily be taken up in the pockets in which the locking bodies are accommodated.

BRIEF DESCRIPTION OF THE DRAWINGS

Some embodiments of the locking device according to the invention will now be described in detail below while referring to the attached drawings.

DESCRIPTION OF THE PREFERRED EMBODIMENTS

Figure 1:
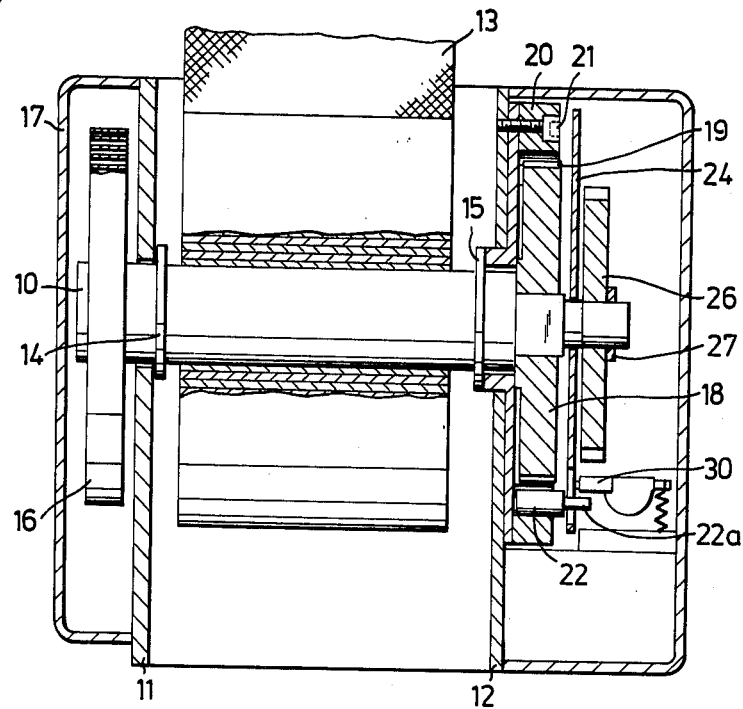
FIG. 1 shows a cross section through a coiling device with a vehicle responsive locking catch device according to the invention.
Figure 2:
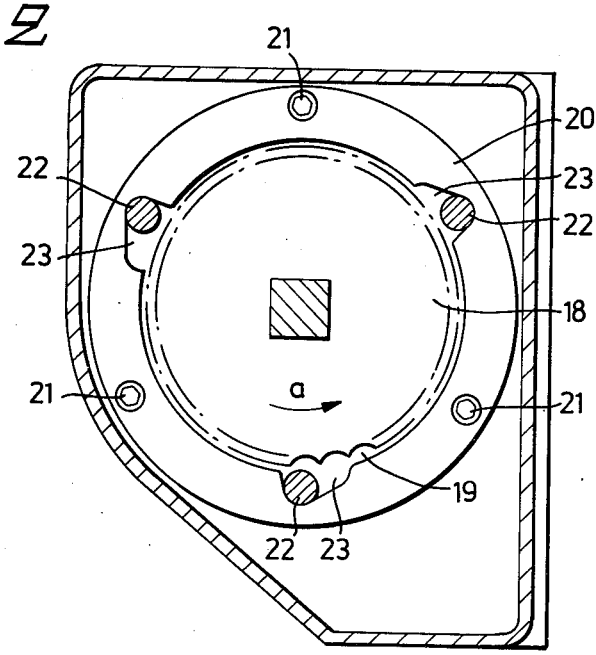
FIG. 2 shows the locking mechanism itself of the locking device shown in FIG. 1.

The coiling device shown in FIG. 1 for the strap in a seat belt comprises a coiling shaft 10, rotatably mounted in two parallel walls 11, 12, and on which a strap 13 being part of the seat belt can be wound up. The shaft is provided with two locking plates 14, 15 adjacent the insides of the walls 11, 12 to prevent axial displacement of the shaft, which at its lefthand end in FIG. 1 is provided with a helical spring 16, one end of which is attached to the shaft, the other end being attached to a casing 17 surrounding the spring, which casing is fixed to the adjacent wall 11. The helical spring is arranged for tensioning when the strap is wound off from the shaft and to automatically wind up the strap on the spindle again when the seat belt is not used. At its other end the shaft is provided with a ratchet wheel 18, having a toothed ring 19 and non-rotatably attached to the shaft and thus accompanying it on its rotation, the toothing on the ratchet wheel being shown more clearly in FIG. 2. A locking means 20 in the form of a circular ring is attached to the outside of the wall 12 by means of screws 21 concentrically about the shaft 10, the ring having an inner diameter which is somewhat larger than the diameter of the wheel 18, so that the wheel 18 can rotate freely in the ring. In the locking means 20 there are accomodated three locking bodies 22, as shown in FIG. 2. These locking bodies are arranged in pockets 23 having a deeper outer portion, seen radially, in which the locking bodies can lie without coming into contact with the ratchet wheel 18, and a shallower inner portion, seen radially, in which the locking bodies are placed when they are to engage with the ratchet wheel 18. The bottoms of the pockets incline obliquely in towards the periphery of the ratchet wheel in the direction, denoted by the arrow a, in which the ratchet wheel periphery travels when strap is unwound from the shaft. The shallower portion of each pocket is thus behind the deeper portion of the same pocket, as seen in the direction of travel of the shaft when uncoiling strap from the shaft. When moving from the deeper portion of the pocket, which provides the free or neutral position of the locking body, to the shallower portion of the pocket, which provides the locking position of the locking body, the locking body thus moves in the same direction as the ratchet wheel 18, whereby the difference in relative speed of the locking body and ratchet wheel will be comparatively small, when the ratchet wheel is engaged by the locking body.

Figure 3:
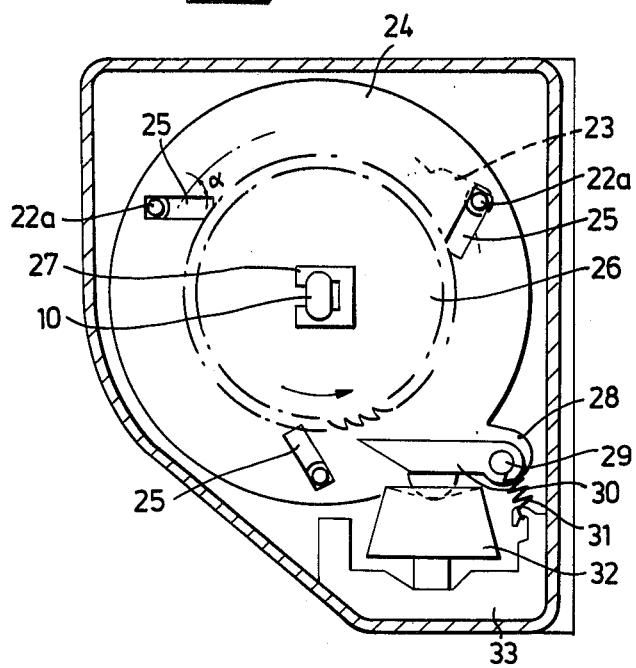
FIG. 3 shows the guidance of the locking bodies of the locking device shown in FIGS. 1 and 2.

A guide plate 24 is rotatably mounted on the shaft outside the ratchet wheel 18 and locking means 20, so that it does not accompany the rotation of the shaft. The guide plate is placed adjacent the ratchet wheel 18 and is provided with a guide slot 25 for each locking body 22, as is shown in FIG. 3. The locking bodies 22 consist of cylindrical rollers and are provided at their ends facing towards the guiding plate with a neck 22a projecting into the associated slot 25 in the guide plate. The diameter of the guiding necks and the dimensions of the guide slots are so matched that the movement of the locking bodies can be guided by turning the guide plate 24 about the shaft 10. The slots 25 in the embodiment shown are straight, and form an angle $\alpha$ with the radius. This angle should lie between 5° and 60°, preferably between 15° and 30°. The outer ends of the slots lie in front of the radius which goes through the centre of the respective slot seen in the direction, denoted by the arrow a, in which the shaft rotates when strap is wound off. Immediately outside the guide plate 24 there is a toothed wheel 26 arranged on the shaft 10, said toothed wheel 26 being non-rotatably fixed to the shaft and thus accompanies the shaft during its rotation. The toothed wheel is retained on the shaft by means of a circlip 27.

As is more clearly shown in FIG. 3, the guide plate 24 is provided with a projecting lug 28 on which a pin 29 is arranged. On this pin a pawl 30 is pivotably mounted, the pawl lying in substantially the same plane as the toothed wheel 26. The pin 29 is placed outside the circumference of the toothed wheel 26 and the tip of the pawl is so arranged that when the pawl is turned about the pin 29 (clockwise in FIG. 3) it will come into engagement with the teeth on the toothed wheel 26, so that the guide plate 24 is coupled to the shaft and is turned together with it when strap is drawn out. One end of a spring 31 is attached to the pin 29 and the other end is attached to a fixed point, so that the guide plate 24 can be returned to the original position in which it is when the shaft is not locked. The pawl 30 rests with its downward portion on a tiltable means 32 provided with a foot having its bottom surface resting against a flat surface in a cup 33. The tiltable means is arranged to tilt to an inclined position when the vehicle is accelerated or retarded in any direction, and thereby to lift the pawl 30 into engagement with the teeth on the toothed wheel 26. When the acceleration or retardation of the vehicle stops, the tiltable means 32 returns to its upright position, whereby the pawl can fall from engagement with the toothed wheel 26.

The device shown in FIGS. 1-3 works in the following way. When the tiltable means 32, e.g. due to heavy braking of the vehicle, moves to a tilted position, the pawl 30 is moved into engagement with the toothed wheel 26. If the person wearing the seat belt moves forward so that strap is drawn out, the guide plate 24 will turn with the shaft because of the coupling provided by the pawl between the wheel 26 and the guide plate 24. When the guide plate turns, the locking bodies 22 will be displaced from their neutral positions to their locking positions because of the function of the guiding slots 25, whereby the continued rotation of the shaft is prevented, so that further withdrawal of strap cannot occur. When tension in the strap ceases, the helical spring 26 will retract a portion of the strap into the coiling device, whereby the toothed wheel 26 is turned at least somewhat in the opposite direction, so that the pawl 30 is released and the guide plate 24 can be turned back to its normal position by the spring 31. In this embodiment, locking of the shaft is accomplished by the locking device as a result of cooperation between the vehicle-responsive means 32 and a pull on the strap in the direction of withdrawal.

Figure 4:
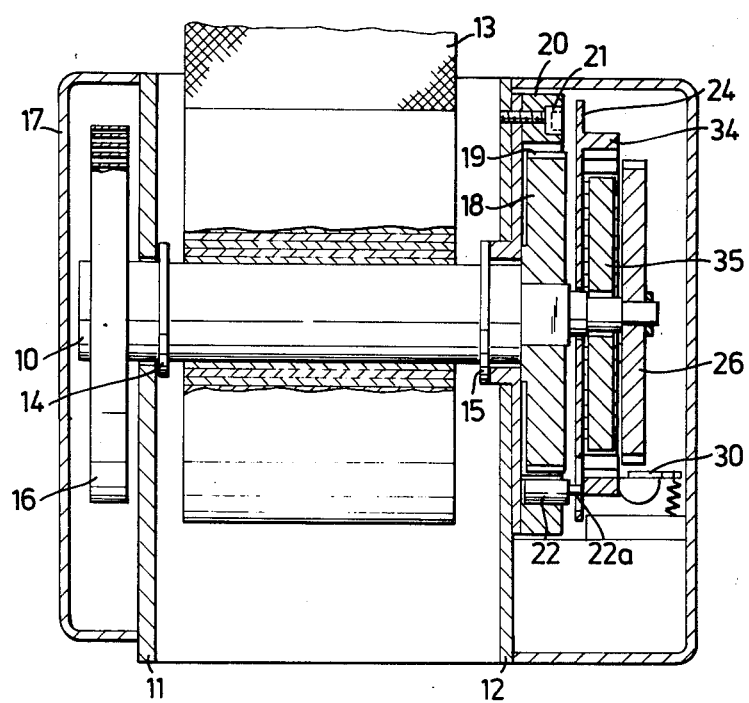
FIG. 4 shows a locking device according to the invention which is responsive to both vehicle and strap movement.

The embodiment shown in FIG. 4 agrees in principle with the embodiment shown in FIGS. 1-3 but with a modification for providing a locking device which is responsive both to vehicle and strap. In order to simplify the description, corresponding items have been given the same reference numerals in FIGS. 1 and 4.

In the embodiment according to FIG. 4, to provide strap responsiveness in the locking device, the guide plate 24 is equipped with a ring of teeth 34 forming a bowl-like space around the centre of the guide plate. A disc 35 is accommodated in this space in such a way about the shaft that it can be displaced radially in relation thereto in response to the action of centrifugal force when the shaft is rapidly rotated, and is thereby caused to come into engagement with the teeth 34 on the guide plate 24, by means of a tooth or other projecting portion. The radially displaceable disc 35 is provided with a central hole which is larger than that which would be required for the shaft, and this hole is so shaped that the disc can be displaced in a radial direction on the shaft, although it accompanies the shaft during rotation of the latter. The disc 35 is also spring biassed such that the disc is returned to its normal, neutral position, in which there is no coupling between the guide plate 24 and the shaft 10. The toothed wheel 26, as in the previous embodiment, is arranged at the end of the shaft, and the pawl 30 is arranged in the same plane as the toothed wheel 26 in this case as well. The strap responsiveness of the locking device is thus achieved by means of the guide plate 24 and the radially displaceable means 35 actuated by centrifugal force. On rapid withdrawal of the strap there is a rapid rotation of the shaft and this rotation provides the centrifugal force required to actuate the means 35. After the guide plate 24 has been coupled to the shaft, further rotation of the shaft due to withdrawal of strap results in turning the guide plate, so that the locking bodies 22 are brought into engagement with the ratchet wheel 18 in the way described above. The vehicle-responsive locking of the shaft is provided in exactly the same way as described for the embodiment shown in FIGS. 1-3.

In the embodiment according to FIG. 4, instead of the means 35 controlled by centrifugal force, an inertia control means of known type can be used, the inertia controlled means in its rotation in relation to the shaft causing a spring, a plate or the like to be moved outwards for providing coupling between the guide plate and the shaft to turn the guide plate.

Even if only a few embodiments have been described and indicated above, it is obvious that a great number of embodiments and modifications are possible within the scope of the invention. For example, the ratchet wheel can be provided with teeth on a side surface instead of on the circumference, and the locking means can consist of one or more parts and does not need to have the shape of a ring surrounding the ratchet wheel. The locking bodies can further be formed as rods, balls or latches and thus do not need to consist of cylindrical rollers. Guiding the locking bodies can also be done with guiding strips or similar elements on the guide plate instead of elongate through slots in the plate, and neither does the latter need to be circular. The guide plate does not need to be mounted on the shaft but can be rotatably mounted on the locking means, for example. The coupling between the guide plate and the shaft, or a means non-rotatably fixed to the shaft, can be provided by many different forms of means controlled by centrifugal or inertia force to provide a strap responsive locking device, and by means of many different types of latches which can be controlled by pivotable means or pendulums or the like, to provide a vehicle-responsive locking device. The coupling can, furthermore, easily be provided magnetically, e.g. by closing a current circuit by a sensing means common to all the seat belts in the vehicle. Returning the guide plate and the locking bodies to the respective neutral positions can be done using arbitrary spring means. The locking bodies can further be arranged for displacement in an axial direction from a neutral position to a locking position.

We claim:

1. A locking device for seat belts intended for vehicles of the type in which a strap, being a part of the seat belt, is automatically drawn into and wound up on a rotatable coiling shaft when the seat belt is not used, to temporarily lock said shaft, the locking device comprising a ratchet means rigidly attached to said shaft; a locking means fixedly mounted in relation to said shaft, said locking means being positioned adjacent said ratchet means outside its path of rotation; at least one locking body movably accommodated in a pocket in said locking means and arranged for displacement from a neutral position to a locking position in which said locking body engages with said ratchet means for preventing rotation of said shaft, said pocket having a bottom inclining towards said ratchet means in substantially the direction of rotation of said ratchet means during withdrawal of belt; a rotatably mounted guiding means provided with a guiding surface for said locking body; means for coupling said guiding means to said shaft at the beginning of the locking operation for turning said guiding means with said shaft from a neutral position for moving said locking body to its locking position; and means for returning said guiding means to its neutral position, when the tension in the strap ceases, for returning said locking body to its neutral position, and wherein said locking bodies consist of cylindrical rollers having a neck projecting and fitting into the associated slot in said guiding means.

2. A locking device for seat belts intended for vehicles of the type in which a strap, being a part of the seat belt, is automatically drawn into and wound up on a rotatable coiling shaft when the seat belt is not used, to temporarily lock said shaft, the locking device comprising a ratchet means rigidly attached to said shaft; a locking means fixedly mounted in relation to said shaft, said locking means being positioned adjacent said ratchet means outside its path of rotation; at least one locking body movably accommodated in a pocket in said locking means and arranged for displacement from a neutral position to a locking position in which said locking body engages with said ratchet means for preventing rotation of said shaft, said pocket having a bottom inclining towards said ratchet means in substantially the direction of rotation of said ratchet means during withdrawal of belt; a rotatably mounted guiding means provided with a guiding surface for said locking body; means for coupling said guiding means to said shaft at the beginning of the locking operation for turning said guiding means with said shaft from a neutral position for moving said locking body to its locking position; and means for returning said guiding means to its neutral position, when the tension in the strap ceases, for returning said locking body to its neutral position, and wherein said shaft is provided with a means rotating with said shaft and provided with a central hole which is larger than the cross-section area of said shaft, said means being capable of radial displacement on rapid rotation of said shaft to an outer position in which said means engages with a projection on said guiding means for turning it.

3. A locking device for seat belts intended for vehicles of the type in which a strap, being a part of the seat belt, is automatically drawn into and wound up on a rotatable coiling shaft when the seat belt is not used, to temporarily lock said shaft, the locking device comprising a ratchet means rigidly attached to said shaft; a locking means fixedly mounted in relation to said shaft, said locking means being positioned adjacent said ratchet means outside its path of rotation; at least one pocket in said locking means, each said pocket having a wall inclining towards said ratchet means obliquely in the direction of rotation of said ratchet means during withdrawal of belt; at least one cylindrical locking body accommodated in each said pocket, each said locking body being arranged for displacement along said wall from a neutral position to a locking position in which said locking body engages with said ratchet means for preventing rotation of said shaft; a rotatably mounted guiding means provided with a guiding surface for said locking body; means for coupling said guiding means to said shaft at the beginning of the locking operation for turning said guiding means with said shaft from a neutral position for moving said locking body to its locking position; and means for returning said guiding means to its neutral position, when the tension in the strap ceases, for returning said locking body to its neutral position.

4. A locking device as claimed in claim 3, wherein said ratchet means comprises a wheel provided with a ring of teeth along its periphery, said locking means encircling said wheel and containing at least two spaced locking bodies each resting in a pocket having an inner, deeper portion and being open towards said wheel, and said guiding means comprises a plate rotatably mounted on said shaft adjacent to said locking means, said plate being provided with a slot for each locking body into which a neck of the associated said locking body projects, so that the locking body is guided by said slots when said plate of said guiding means is turned, said means for returning said guiding plate comprising a spring connected between said guiding plate and a fixed point.

5. A locking device as claimed in claim 4, wherein said slots in said guiding means are inclined forwardly and form an angle $\alpha$ in the range of from about 5° to about 60°, with the direction of the radius through the centre of the respective slot, so that the relative difference in speed between said locking bodies and the periphery of said ratchet means in the locking movement is small and that said locking bodies are reliably retained in the inner portion of said pockets, when said guiding means is in its neutral position.

6. A locking device according to claim 5, wherein said angle $\alpha$ is in the range of from about 15° to about 30°.

7. A locking device as claimed in claim 5, wherein said locking body consists of a roller having a neck projecting and closely fitting into said slot in said guiding means.

8. A locking device as claimed in claim 3, wherein said coupling means comprises a second ratchet wheel rigidly attached to said shaft adjacent said guiding means and provided with teeth at its periphery, a pawl pivotably mounted about a pin attached to said guiding means radially outside the teeth of said second ratchet wheel, and a movable inertia means of the vehicle sensitive type positioned outside said guiding means and arranged to bring said pawl into and out of engagement with the teeth of said second ratchet wheel in response to the movements of the vehicle for turning said guiding means.

9. A locking device as claimed in claim 3, wherein said shaft is provided with a means rotating with said shaft and provided with a central hole which is larger than the cross-section area of said shaft, said means being capable of radial displacement on rapid rotation of said shaft to an outer position in which said means engages with a projection on said guiding means for turning it.

* * * * *